US012724575B2

(12) United States Patent
Kojima

(10) Patent No.: US 12,724,575 B2
(45) Date of Patent: Sep. 1, 2026

(54) PRINTING APPARATUS HAVING CONTRACTUAL INFORMATION CONTROL, METHOD FOR CONTROLLING THEREOF, AND STORAGE MEDIUM

(71) Applicant: CANON KABUSHIKI KAISHA, Tokyo (JP)

(72) Inventor: Ryoko Kojima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 18/414,509

(22) Filed: Jan. 17, 2024

(65) Prior Publication Data

US 2024/0256197 A1 Aug. 1, 2024

(30) Foreign Application Priority Data

Jan. 27, 2023 (JP) ................................ 2023-011219

(51) Int. Cl.
*G06F 3/12* (2006.01)
*H04N 1/00* (2006.01)
*H04N 1/34* (2006.01)

(52) U.S. Cl.
CPC .......... *G06F 3/1239* (2013.01); *G06F 3/1204* (2013.01); *G06F 3/1253* (2013.01); *H04N 1/0048* (2013.01); *H04N 1/00501* (2013.01); *G06F 3/1231* (2013.01); *G06F 3/1285* (2013.01); *H04N 1/00474* (2013.01); *H04N 1/344* (2013.01); *H04N 1/346* (2013.01)

(58) Field of Classification Search
CPC .... G06F 3/1239; G06F 3/1204; G06F 3/1253; G06F 3/1231; G06F 3/1285; H04N 1/0048; H04N 1/00501; H04N 1/00474; H04N 1/344; H04N 1/346
See application file for complete search history.

(56) References Cited

U.S. PATENT DOCUMENTS 11,582,364 B2 2/2023 Yamada
11,656,815 B2 5/2023 Kojima
11,785,165 B2 10/2023 Yamada
2015/0146243 A1* 5/2015 Tsujimoto ............ H04N 1/4433 358/1.15
2018/0091688 A1* 3/2018 Morita ............... H04N 1/00474
2021/0405931 A1* 12/2021 Kawano ................ G06F 3/1255
2021/0405932 A1* 12/2021 Kawano ................ G06F 3/1258
2021/0405944 A1* 12/2021 Kawano ................ G06F 3/1258
2022/0100440 A1* 3/2022 Yamada ................ G06F 3/1285
(Continued)

FOREIGN PATENT DOCUMENTS

JP 2022-056969 A 4/2022

*Primary Examiner* — Nicholas Pachol
(74) *Attorney, Agent, or Firm* — VENABLE LLP

(57) ABSTRACT

A printing apparatus communicates with a server managing contractual information of a service of the printing apparatus and acquires the contractual information from the server and reacquires the contractual information in response to an operation by a user selecting a predetermined button configured to display content related to the contractual information on a display device, in a case where the contractual information had not been acquired. A function that displays the content related to the contractual information on the display device is restricted to be used because of failure in acquiring the contractual information.

9 Claims, 7 Drawing Sheets

(56) References Cited

U.S. PATENT DOCUMENTS

2022/0179601 A1* 6/2022 Minamikawa ........ G06F 3/1205
2022/0232141 A1* 7/2022 Shimba .............. H04N 1/00933
2022/0239786 A1* 7/2022 Tsujinaka ........... H04N 1/00244

* cited by examiner

FIG. 2

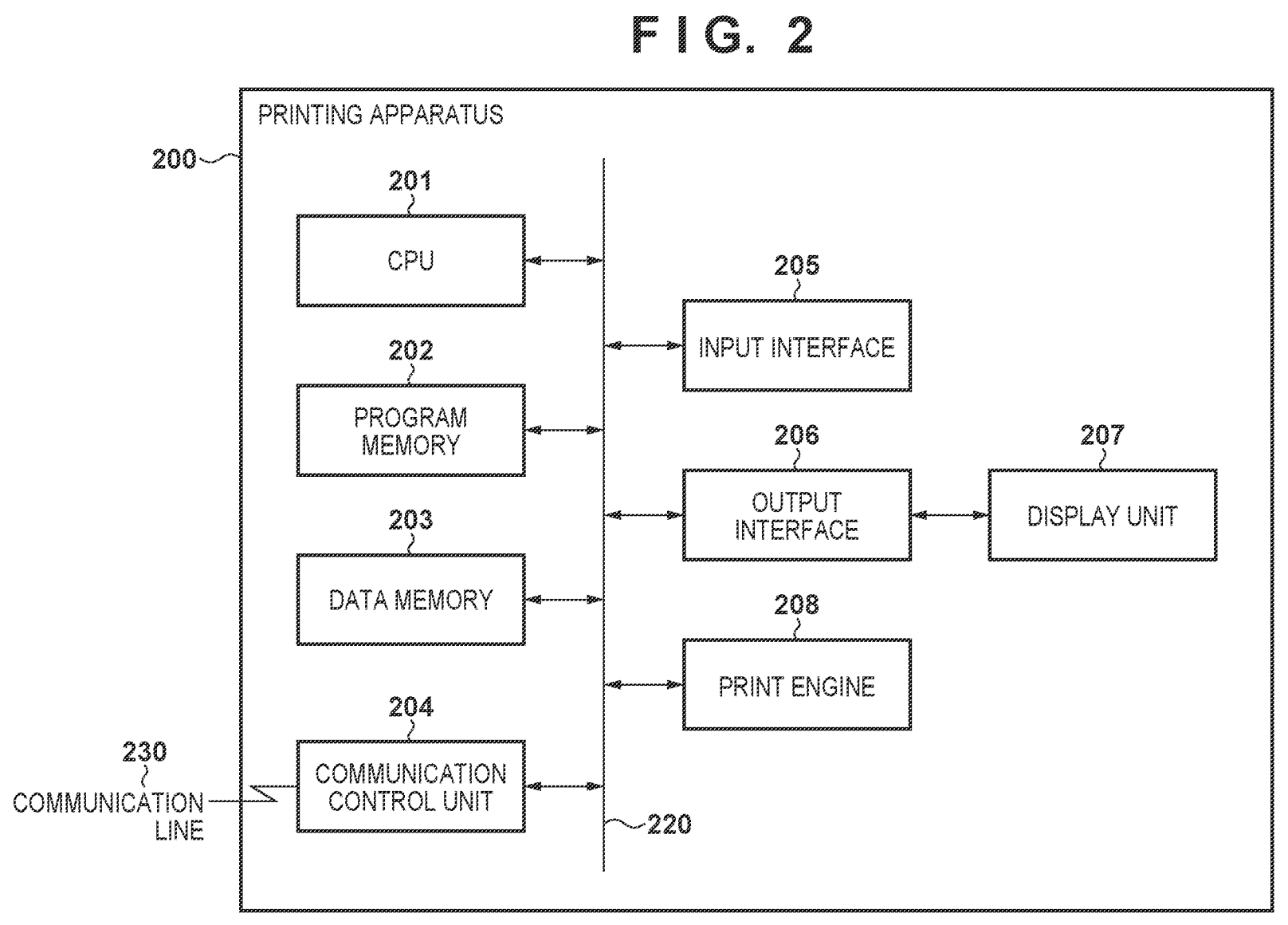

200
PRINTING APPARATUS
201 CPU
202 PROGRAM MEMORY
203 DATA MEMORY
204 COMMUNICATION CONTROL UNIT
205 INPUT INTERFACE
206 OUTPUT INTERFACE
207 DISPLAY UNIT
208 PRINT ENGINE
220
230 COMMUNICATION LINE

300
USER
400
FLAT-RATE SERVICE MANAGEMENT SERVER
200
PRINTING APPARATUS
S101
FLAT-RATE SERVICE CONTRACT
S102
SERVICE REGISTRATION PROCESSING
S103
DELIVER PRINTING APPARATUS
S104
INITIAL SETUP OF PRINTING APPARATUS
S105
INITIAL SETUP PROCESSING
S106
ACQUIRE CONTRACTUAL INFORMATION
CONTRACTUAL INFORMATION NOTIFICATION
S107
S108
RELEASE FUNCTION RESTRICTION

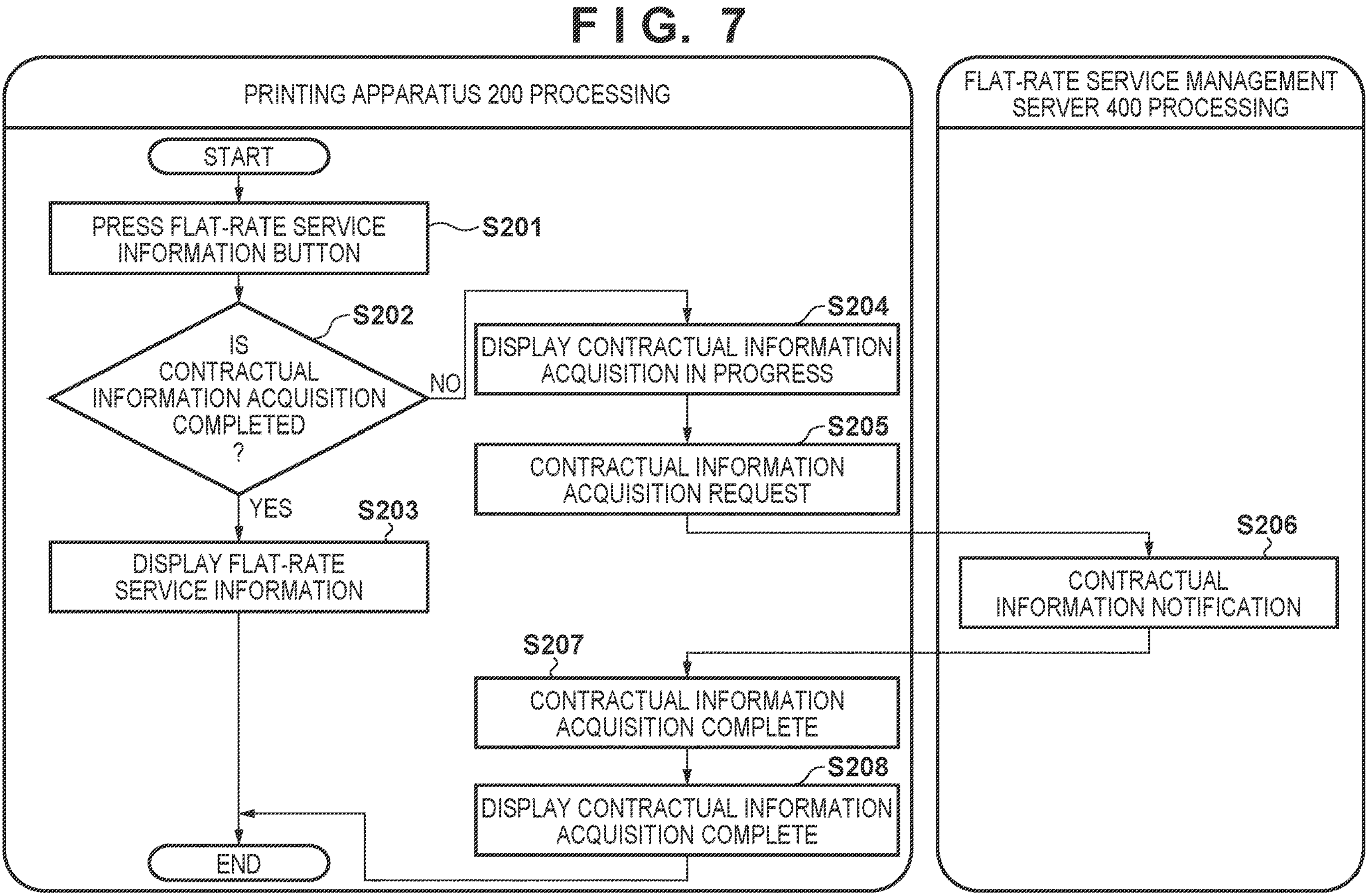
FIG. 7
PRINTING APPARATUS 200 PROCESSING
START
PRESS FLAT-RATE SERVICE INFORMATION BUTTON
S201
IS CONTRACTUAL INFORMATION ACQUISITION COMPLETED ?
S202
NO
YES
DISPLAY FLAT-RATE SERVICE INFORMATION
S203
DISPLAY CONTRACTUAL INFORMATION ACQUISITION IN PROGRESS
S204
CONTRACTUAL INFORMATION ACQUISITION REQUEST
S205
S207
CONTRACTUAL INFORMATION ACQUISITION COMPLETE
S208
DISPLAY CONTRACTUAL INFORMATION ACQUISITION COMPLETE
END
FLAT-RATE SERVICE MANAGEMENT SERVER 400 PROCESSING
S206
CONTRACTUAL INFORMATION NOTIFICATION

FIG. 8

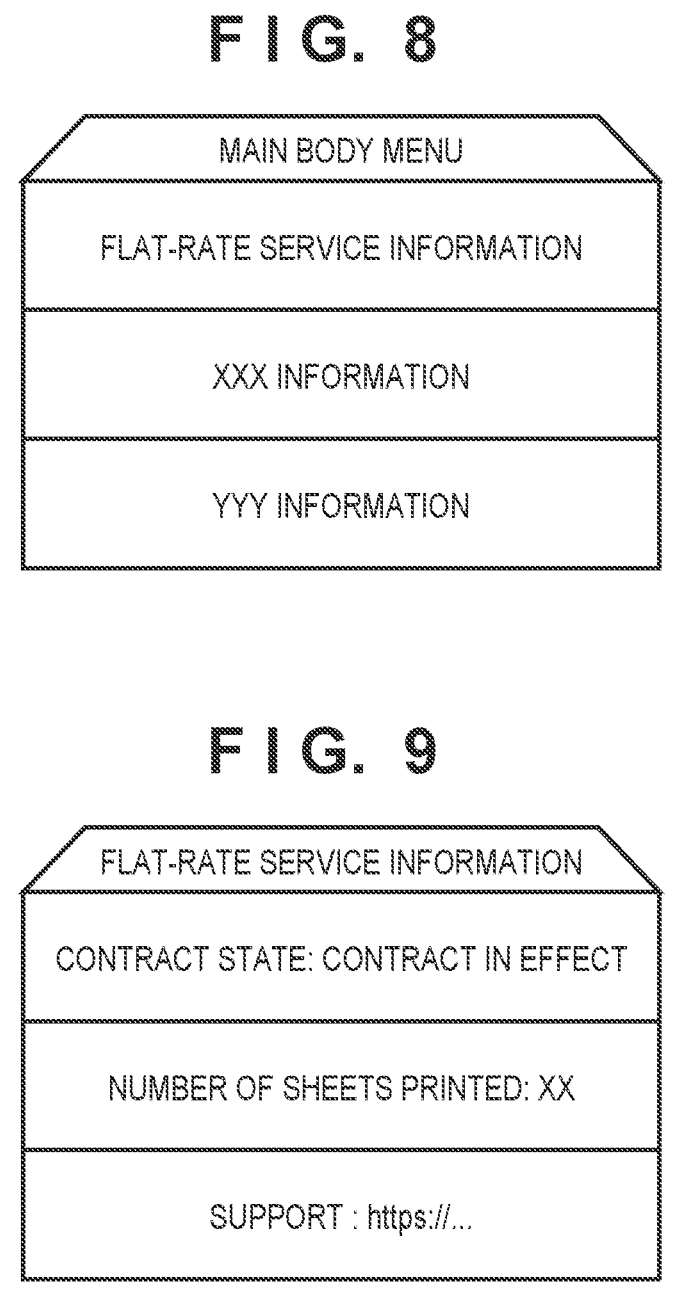

MAIN BODY MENU

FLAT-RATE SERVICE INFORMATION

XXX INFORMATION

YYY INFORMATION

FIG. 9

FLAT-RATE SERVICE INFORMATION

CONTRACT STATE: CONTRACT IN EFFECT

NUMBER OF SHEETS PRINTED: XX

SUPPORT : https://...

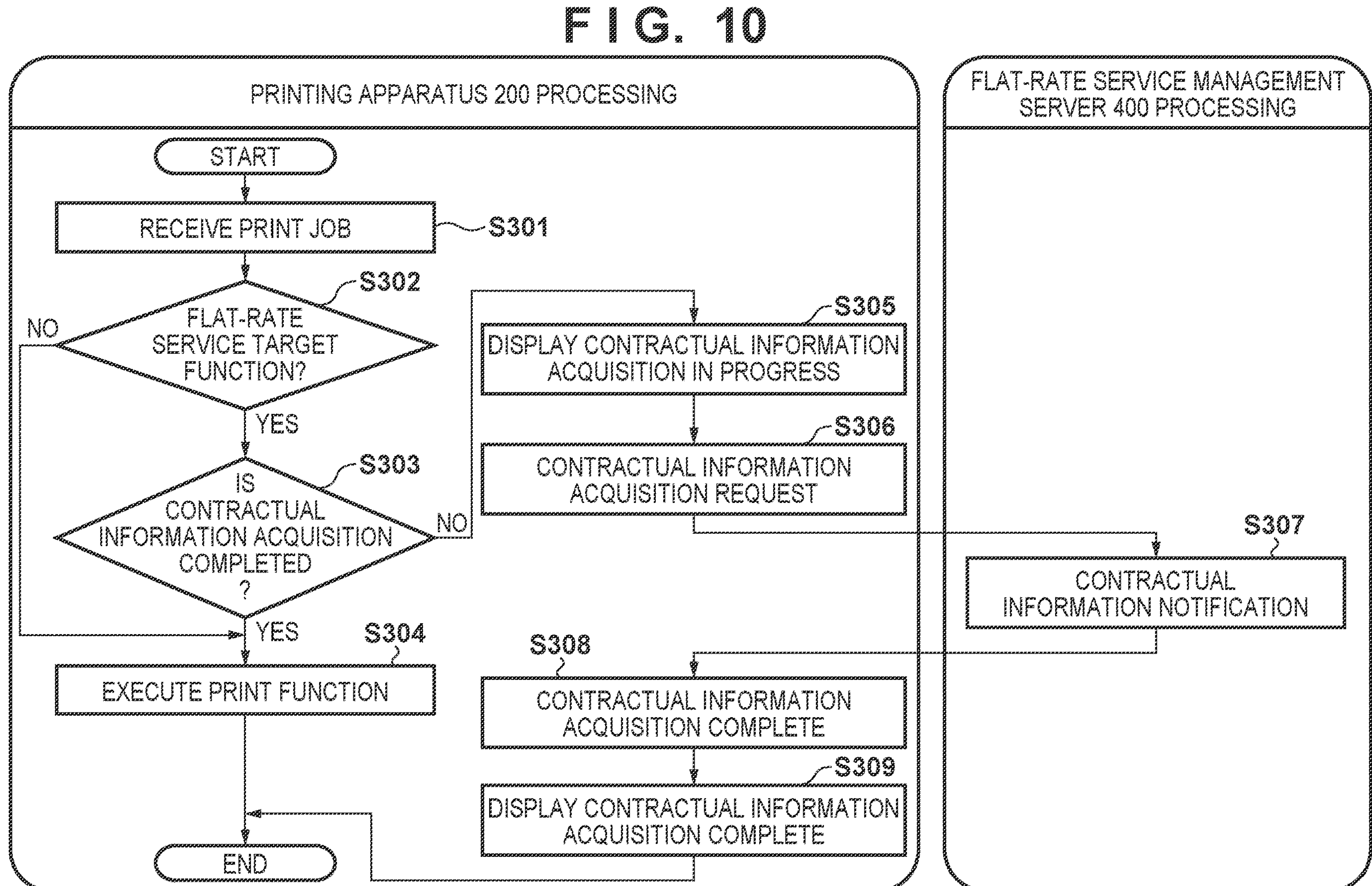
FIG. 10
PRINTING APPARATUS 200 PROCESSING
FLAT-RATE SERVICE MANAGEMENT SERVER 400 PROCESSING
START
RECEIVE PRINT JOB
S301
S302
FLAT-RATE SERVICE TARGET FUNCTION?
NO
YES
S303
IS CONTRACTUAL INFORMATION ACQUISITION COMPLETED ?
NO
YES
S304
EXECUTE PRINT FUNCTION
END
S305
DISPLAY CONTRACTUAL INFORMATION ACQUISITION IN PROGRESS
S306
CONTRACTUAL INFORMATION ACQUISITION REQUEST
S307
CONTRACTUAL INFORMATION NOTIFICATION
S308
CONTRACTUAL INFORMATION ACQUISITION COMPLETE
S309
DISPLAY CONTRACTUAL INFORMATION ACQUISITION COMPLETE

PRINTING APPARATUS HAVING CONTRACTUAL INFORMATION CONTROL, METHOD FOR CONTROLLING THEREOF, AND STORAGE MEDIUM

BACKGROUND OF THE INVENTION

Field of the Invention

The present invention relates to a technique for enabling functions of a flat-rate system for service in a printing apparatus.

Description of the Related Art

For a printing apparatus having a network function, various services, such as failure analysis or accounting, are operated by transmitting device information and a usage history of the user to a management server. An example of such services is a delivery service in which, for example, consumables such as ink are managed by a management server and the consumables are delivered automatically when the remaining amount is running low. In recent years, by introducing subscription contracts, a service provided by flat-rate is expanding in which a device main body and consumables are lent to a user who has contracted for the service without imposing initial investment or maintenance costs.

Under such a contract type flat-rate service, a printing apparatus communicates with a management server to acquire contractual information such as a contractual status of the service from the management server, the printing apparatus is controlled according to the contractual information. Specifically, use of the printing apparatus may be restricted until completion of service authentication confirming that the contract type flat-rate service is contracted.

For example, Japanese Patent Laid-Open No. 2022-56969 discloses a technique in which whether or not the status of the printing apparatus is suitable for transition from a not-contracted mode to a contracted mode is determined, and when it is determined to be suitable, the status is transitioned to the contracted mode, or when it is determined to be not suitable, the not-contracted mode is maintained. The printing apparatus and the server confirm by periodic communication that transition to the contracted mode is completed, and when the completion of transition is successfully confirmed, a contract cartridge is delivered to the user of the printing apparatus, and then the flat-rate printing can be executed.

However, when acquisition of the contractual information has failed in such a configuration, in which the contractual information for releasing the restriction on the function of the printing apparatus is acquired by the periodic communication, a downtime may occur until acquisition of contractual information by the next periodic communication, and the function of the printing apparatus is restricted until the contractual information is successfully acquired.

SUMMARY OF THE INVENTION

The present invention, which has been made in view of the aforementioned problem, provides a mechanism for acquiring information related to a flat-rate system service contract for a printing apparatus, based on user operation.

According to a first aspect of the present invention, there is provided a printing apparatus configured to be able to communicate with a server managing contractual information of a service of the printing apparatus, the printing apparatus comprising: at least one processor or circuit configured to function as an acquisition unit configured to acquire the contractual information from the server, and a control unit configured to cause the acquisition unit to reacquire the contractual information in response to an operation by a user selecting a predetermined button, in a case where the acquisition unit has failed to acquire the contractual information, wherein the predetermined button is a button corresponding to a single function of the printing apparatus, the single function being restricted to be used because of failure in acquiring the contractual information.

According to a second aspect of the present invention, there is provided a method for controlling a printing apparatus configured to be able to communicate with a server managing contractual information of a service of the printing apparatus, the method comprising: acquiring the contractual information from the server; and causing the acquiring to reacquire the contractual information in response to an operation by a user selecting a predetermined button, in a case where the acquiring has failed to acquire the contractual information, wherein the predetermined button is a button corresponding to a single function of the printing apparatus, the single function being restricted to be used because of failure in acquiring the contractual information.

Further features of the present invention will become apparent from the following description of exemplary embodiments with reference to the attached drawings.

BRIEF DESCRIPTION OF THE DRAWINGS

FIG. 2 is a block diagram illustrating a configuration of a printing apparatus;

FIG. 4 is a diagram illustrating a notification screen of activation guidance in the printing apparatus;

FIG. 5 is a diagram illustrating a notification screen of activation completion in the printing apparatus;

FIG. 6 is a diagram illustrating an error screen of activation failure in the printing apparatus;

FIG. 7 is a sequence diagram when a flat-rate service information button is pressed in the printing apparatus;

FIG. 8 is a diagram illustrating a menu screen including a flat-rate service information button in the printing apparatus;

FIG. 9 is a diagram illustrating a flat-rate service information reference screen in the printing apparatus; and FIG. 10 is a sequence diagram when a print function is executed in the printing apparatus.

DESCRIPTION OF THE EMBODIMENTS

Figure 1:
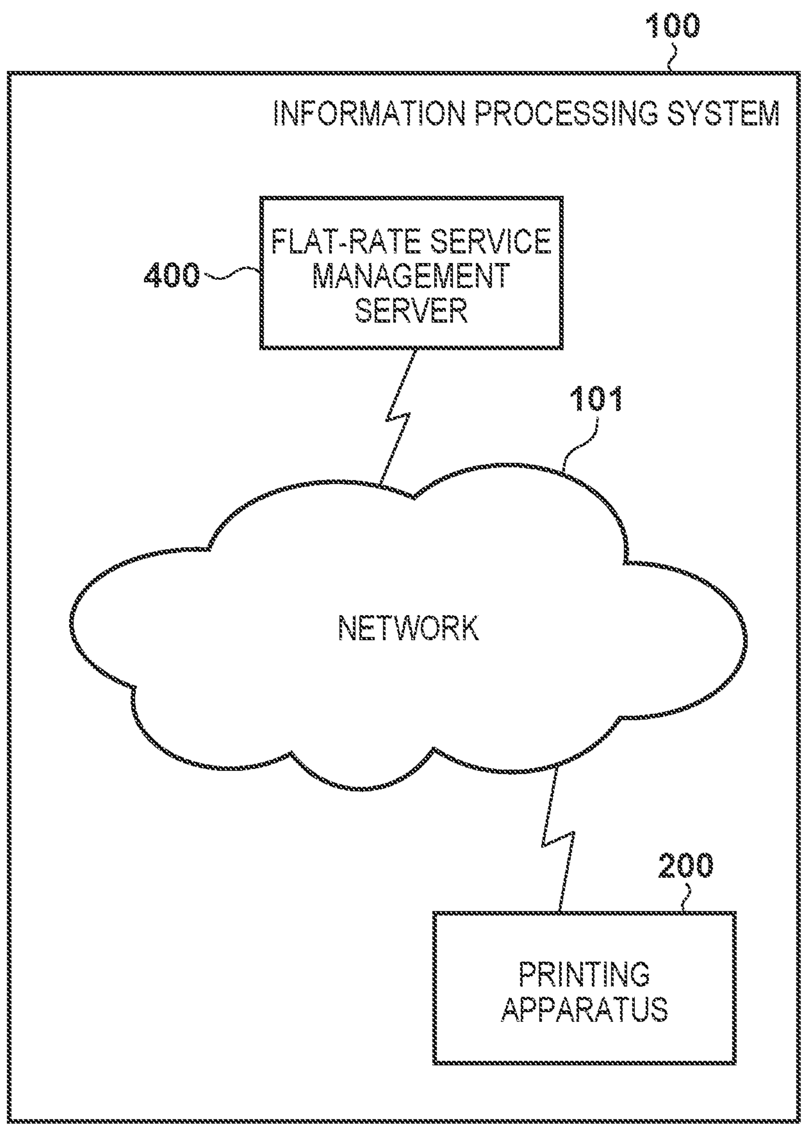
FIG. 1 is a schematic diagram illustrating a configuration of an information processing system according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram illustrating a configuration of an information processing system according to a first embodiment. An information processing system 100 includes a network 101, a printing apparatus 200 communicably connected via the network 101, and a flat-rate service management server 400.

FIG. 2 is a diagram illustrating a configuration of a printing apparatus 200 in the present embodiment. The printing apparatus 200 includes a CPU 201, a program memory 202, a data memory 203, a communication control unit 204, an input interface 205, an output interface 206, a display unit 207, and a print engine 208. The components are communicably connected to each other by a CPU bus 220 managed by the CPU 201.

The CPU 201, which is a system control unit including a microcomputer, controls the entire printing apparatus 200.

The program memory 202 stores a control program, an embedded operating system program or the like executed by the CPU 201.

The data memory 203 stores program control variables or the like, and various work buffer areas used in processing by the print engine 208 are provided in the data memory 203.

The communication control unit 204 controls data exchange with the outside via a communication line 230.

The input interface 205, which is an interface configured to accept data input and operation instructions from a user, includes a physical keyboard, buttons, a touch panel, or the like. Here, the output interface 206 and the input interface 205 described below may be configured as a same component and outputting to the screen and accepting operations from the user may be performed by the same component. The output interface 206 is an interface configured to control the display unit 207 to display data and notify the status of the printing apparatus 200.

The display unit 207, which includes a light-emitting diode (LED), a liquid crystal display (LCD) or the like, displays data and notifies the status of the printing apparatus 200. Here, input from the user may be accepted via the display unit 207 by disposing, on the display unit 207, a virtual keyboard or a touch panel including keys such as a numerical value input key, a mode setting key, an enter key, a cancel key, and a power supply key.

The print engine 208 performs printing by forming an image on a print medium such as paper using a printing material such as ink, based on information stored in the data memory 203 or a print job being received.

Next, an outline of a flat-rate service which is one of accounting services provided by the information processing system 100 will be described, referring to FIG. 3.

In general, a flat-rate service is a service of providing a printing environment which claims the same amount until a predetermined number of sheets are printed depending on a price of a monthly plan. When the predetermined number of sheets is exceeded, the plan can be changed to an upper plan, or change to a pay-as-you-go accounting in which the claimed amount increases per each extra sheet.

Figure 3:
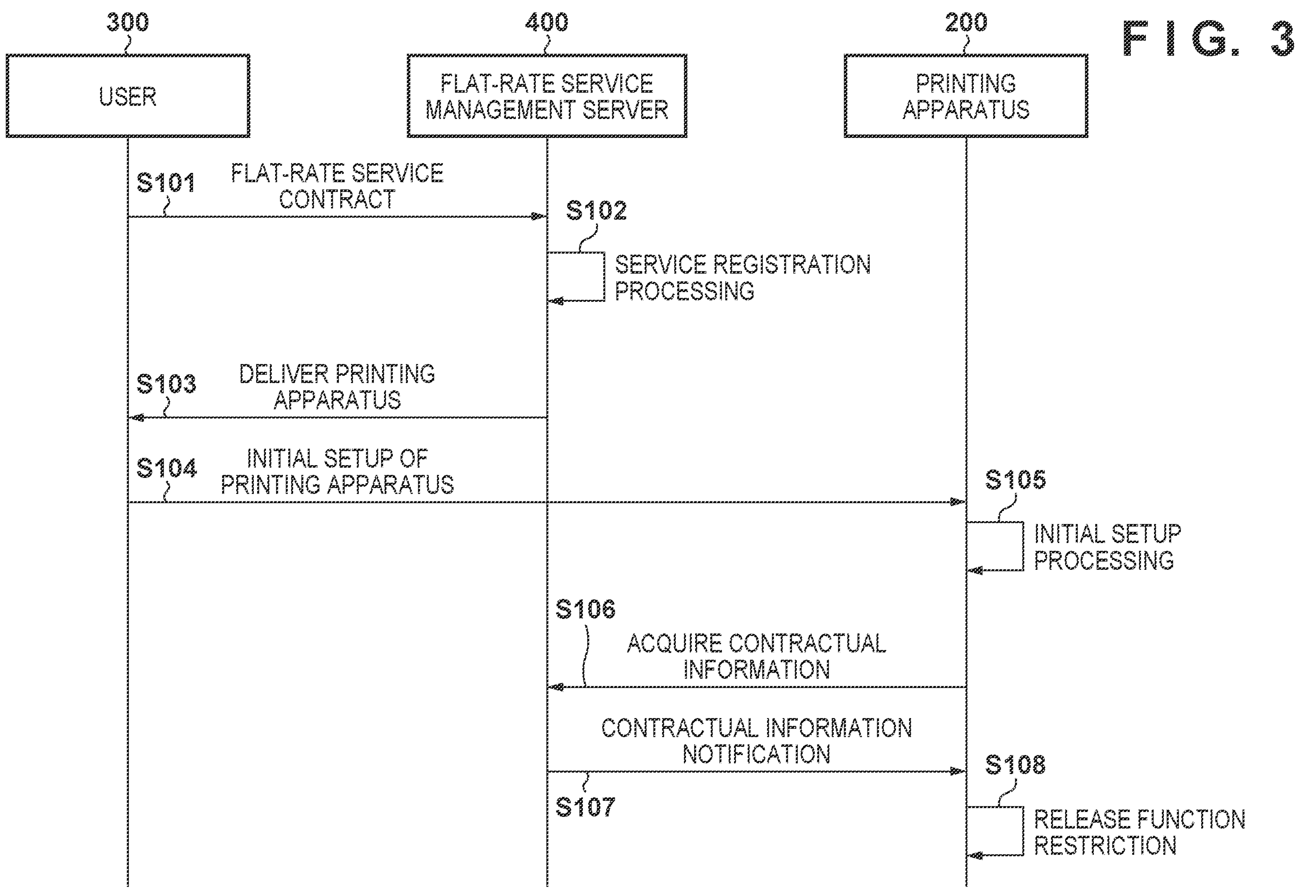
FIG. 3 is a sequence diagram of a flat-rate service.

In FIG. 3, when a user 300 applies a flat-rate service (step S101), a flat-rate service management server 400 performs service registration processing that associates the user 300 with the printing apparatus 200 to be delivered to the user (step S102).

In response to the service registration processing, the flat-rate service management server 400 performs processing of delivering the printing apparatus 200 including consumables to the user (step S103).

The user 300 performs an initial setup of the printing apparatus 200 being received (step S104).

The printing apparatus 200 proceeds the initial setup processing in accordance with an instruction from the user 300, and performs initial setting such as network setting for connecting to the Internet (step S105).

Upon completing the network setting, the printing apparatus 200 transmits a contractual information acquisition request with identification information of the printing apparatus 200 to the flat-rate service management server 400 (step S106).

Based on the identification information of the printing apparatus 200, the flat-rate service management server 400 notifies the printing apparatus 200 of the contractual information of the flat-rate service being associated (step S107). In the present embodiment, the contractual information refers to contract-related information which includes information for determining that the contract is concluded and is used for activation of the flat-rate service at the time of initial setting of the printing apparatus 200, and in particular in the present embodiment, the contractual information is the information indicating that the contract is concluded.

The printing apparatus 200 stores the received contractual information and releases the function of the printing apparatus 200 related to the flat-rate service that has been restricted, allowing the user 300 to use the function (step S108).

The present embodiment is configured such that the printing apparatus 200 is provided on the premise that the user 300 has contracted the flat-rate service, and therefore the print function of the printing apparatus 200 is restricted until the contractual information is acquired at step S107. Note that, in a case where the printing apparatus 200 is a Multi Function Peripheral (MFP) that can also perform scanning and faxing as functions of the printing apparatus 200, and the scanning and faxing functions are included in the functions provided by the flat-rate service, the scanning and faxing functions are also restricted.

Figures 4, 5, 6:
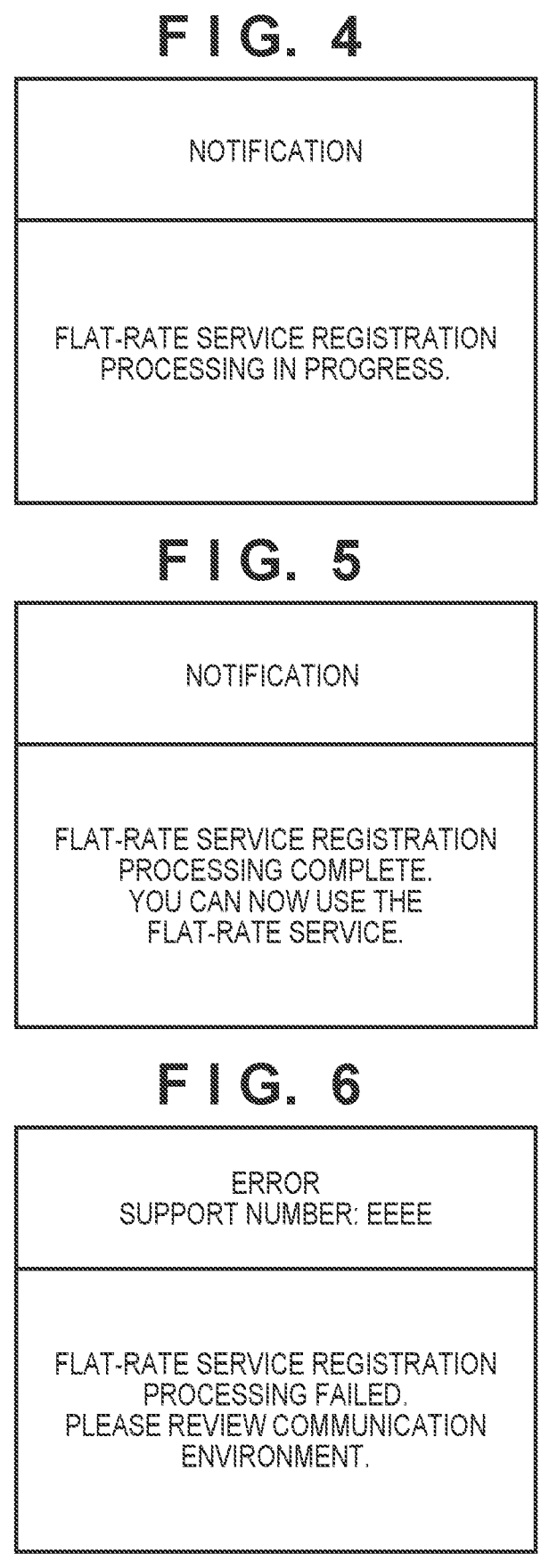

Since the user 300 cannot use the basic functions of the printing apparatus 200 until the printing apparatus 200 acquires the contractual information, the printing apparatus 200 explicitly provides guidance indicating that the activation of the flat-rate service is ongoing (acquisition of contractual information is ongoing) as illustrated in FIG. 4, when requesting the acquisition of the contractual information at step S106.

When the contractual information is successfully acquired, guidance of activation completion is provided as illustrated in FIG. 5, or error guidance is provided as illustrated in FIG. 6 when acquisition of the contractual information is failed due to communication error or the like.

In the flat-rate service, the printing apparatus 200 creates, in accordance with a print job, a job log indicating the number of sheets printed in the job or the amount of consumables consumed, and transmits the job log to the flat-rate service server 400. The flat-rate service is provided such that the flat-rate service server 400 grasps the number of sheets printed per month and calculates a consumption rate of a consumable at the user site based on information of the job log, and delivers the consumable at a timing when the remaining amount of the consumable is running low.

Although the flat-rate service management server 400 performs the processing for realizing the flat-rate service in the present embodiment, a configuration may be possible in which a plurality of servers perform the processing. For example, the server may be distributed in three servers such as a printer management server that manages printing apparatuses, a service management server that manages services, and a server of the sales company that sells the printing apparatus 200 and consumables. In such a case, the server of the sales company accepts an application for a flat-rate service from the user 300 and transmits contractual information to the service management server, or performs processing for delivering the printing apparatus 200 to the user 300 in accordance with service registration described below. The service management server acquires the contractual information and the serial number of the printing apparatus 200 from the server of the sales company, and performs service registration to the printer management server to associate the user 300 and the printing apparatus 200. The printer management server receives the contractual information acquisition request from the printing apparatus 200, and transmits the contractual information acquired from the service management server to the printing apparatus 200 as a response to the request. In addition, when the printing apparatus 200 transmits a print log to the printer management server, the print log is transmitted to the server of the sales company via the service management server, and the server of the sales company performs a consumable delivery processing to the user 300 at an appropriate timing.

Next, referring to FIGS. 7 to 9, a retry sequence in the present embodiment will be described for a case where the acquisition of the contractual information at step S106 is failed.

FIG. 7 is a flowchart illustrating the retry sequence.

The printing apparatus 200 is configured to allow the user to check the information about the flat-rate service from a main body menu displayed on the display unit 207, as illustrated in FIG. 8. The display of FIG. 8 is displayed on the display unit 207 when the user presses a menu button or the like, after the guidance of the activation completion as illustrated in FIG. 5 or the error guidance as illustrated in FIG. 6 is displayed on the display unit 207.

When the user presses a corresponding flat-rate service information button on the display unit 207 including the aforementioned virtual keyboard or touch panel (performs an operation of inquiring about the content the flat-rate service information) (step S201), the printing apparatus 200 determines whether or not acquisition of the contractual information of the flat-rate service is completed (step S202). Although it is described here that the flat-rate service information button displayed on the display unit 207 is directly pressed, the flat-rate service information button may be selected by moving a cursor on the display unit 207 using a cross-key or the like externally arranged to the display unit.

In a case where activation is already completed and the contractual information is acquired (YES at S202), the flat-rate service information recognized by the printing apparatus 200 is displayed on the display unit 207, based on the contractual information received from the flat-rate service management server 400 as illustrated in FIG. 9 (step S203).

In a case where the contractual information is not acquired due to communication error or the like at the time of the initial activation (No at S202), a message indicating that activation of the flat-rate service is being performed again is displayed on the display unit 207 (step S204).

Along with the display at step S204, the printing apparatus 200 transmits a contractual information acquisition request together with the identification number of the printing apparatus 200 to the flat-rate service management server 400 (step S205).

Based on the identification information of the printing apparatus 200, the flat-rate service management server 400 notifies the printing apparatus 200 of the contractual information of the flat-rate service being associated (step S206).

The printing apparatus 200 records the received contractual information (step S207), and displays a message indicating that activation is completed on the display unit 207 (step S208).

Note that, the button configured to display information of the flat-rate service is represented by a character string of "flat-rate service information" in the present embodiment. However, in a case where acquisition of the contractual information is not completed, the character string may be switched to other one that makes it easier for the user to understand that a retry of acquisition of the contractual information is needed.

Here in the present embodiment, the retry timing of acquisition of contractual information describes only one timing when the user presses the flat-rate service information button. However, in a case where communication error is caused by an inappropriate network setting of the printing apparatus 200 and resetting of the network setting can be detected by the printing apparatus 200, the timing of retry may be set to the timing of network resetting.

Depending on whether or not the contractual information of the flat-rate service is acquired, performing the information display of the flat-rate service or re-executing acquisition of the contractual information of the flat-rate service is switched. Whereby the user can manually re-execute the acquisition of the contractual information without reducing the usability of the printing apparatus, even in a case where the timing when the printing apparatus can reacquire the contractual information cannot be detected.

Although the present embodiment has been explained taking, as an example, a case where acquisition of contractual information fails due to communication error, it is not limited thereto. For example, as has been described above, there is a possibility that the contractual information has not yet been transmitted to the device management server before the printing apparatus 200 is delivered to the user, in a case where the role of the flat-rate service management server 400 is distributed in three servers such as a printer management server that manages printing apparatuses, a service management server that manages services, and a server of the sales company that sells the printing apparatus 200 and consumables. In such a case, it is conceivable that the contractual information indicating that the contract is concluded is not transmitted in the contractual information notification of the S107, even when the communication error does not occur. Since acquisition of the contractual information also fails in this case, it is determined to be NO at S202 and the processing at S204 subsequent steps will be performed.

Second Embodiment

In the first embodiment, it is assumed that acquisition of the contractual information of the flat-rate service is re-executed when the button configured to refer the information of the flat-rate service is pressed. In the second embodiment, a case will be described, with referring to FIG. 10, in which the user performs an operation to execute a target function of the flat-rate service in a case where acquisition of the contractual information is not completed.

Here, a configuration of the second embodiment is the same as the configuration of the first embodiment including the information processing system 100, the printing apparatus 200, and the flat-rate service management server 400.

When a user issues a print instruction from a host apparatus such as a personal computer (PC) in order to execute a print function, the printing apparatus 200 receives a print job from the PC or the like (step S301).

The printing apparatus 200 determines whether or not the function to be executed in accordance with the received job is a target function (predetermined function) of the flat-rate service (step S302).

In a case where the function to be executed is the target function of the flat-rate service (YES at S302), the printing apparatus 200 determines whether or not acquisition of the contractual information of the flat-rate service is completed (step S303).

When it is determined at step S302 that the function is not the flat-rate service target function, or when it is determined at step S303 that activation is already completed and the contractual information is already acquired (NO at S302 or YES at S303), the printing function is executed (step S304).

In a case where the contractual information is not acquired due to communication error or the like at the time of the initial activation (NO at S303), the printing function is not executed, and a message indicating that re-activation of the flat-rate service is ongoing is displayed (step S305).

In parallel with step S305, the printing apparatus 200 transmits a contractual information acquisition request with the identification number of the printing apparatus 200 to the flat-rate service management server 400 (step S306).

Based on the identification information of the printing apparatus 200, the flat-rate service management server 400 notifies the printing apparatus 200 of the contractual information of the flat-rate service being associated (step S307).

The printing apparatus 200 records the received contractual information (step S308), and displays a message indicating that activation is completed on the display unit 207 (step S309).

In the present embodiment, after the acquisition of the contractual information is completed at step S308, the completion of the acquisition of the contractual information is displayed and the processing is terminated, but the execution of the printing function at step S304 may be executed without terminating the processing.

In the present embodiment, it is assumed that acquisition of the contractual information of the flat-rate service is re-executed when execution of the printing function is instructed. However, in a case where the printing apparatus 200 is an MFP that can perform scanning and faxing as functions of the printing apparatus 200, and such functions are included in the functions provided by the flat-rate service, acquisition of the contractual information may be re-executed when execution of scanning or faxing is instructed.

Depending on whether or not the contractual information of the flat-rate service is acquired, executing the target function of the flat-rate service or re-executing acquisition of the contractual information of the flat-rate service is switched. Whereby re-execution of acquisition of the contractual information can be possible, even in a case where the timing when the printing apparatus can reacquire the contractual information cannot be detected and thus the function to be executed becomes error. The aforementioned function allows the user to complete activation of the flat-rate service in a case where the cause of the communication error at the initial activation is removed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-011219, filed Jan. 27, 2023, which is hereby incorporated by reference herein in its entirety.

What is claimed is:

1. A printing apparatus configured to be able to communicate with a server managing contractual information of a service of the printing apparatus, the printing apparatus comprising:
- at least one processor or circuit configured to function as
  - an acquisition unit configured to acquire the contractual information from the server, and
  - a control unit configured to cause the acquisition unit to reacquire the contractual information in response to an operation by a user selecting a predetermined button configured to display content related to the contractual information on a display device, in a case where the acquisition unit has failed to acquire the contractual information, wherein
- a function that displays the content related to the contractual information on the display device is restricted to be used because of failure in acquiring the contractual information.

2. The printing apparatus according to claim 1, wherein the control unit displays the predetermined button on the display device after the acquisition unit has performed an operation of acquiring the contractual information.

3. The printing apparatus according to claim 1, wherein the display device includes a virtual keyboard or a touch panel.

4. The printing apparatus according to claim 1, wherein the control unit displays on the display device, indicating that the acquisition unit has successfully acquired the contractual information or failed to acquire.

5. The printing apparatus according to claim 4, wherein the control unit displays the predetermined button on the display device after the control unit displayed on the display device, indicating that the contractual information has been successfully acquired or failed to be acquired.

6. The printing apparatus according to claim 1, wherein the control unit displays on the display device, indicating that the acquisition of the contractual information is ongoing during the acquisition of the contractual information.

7. The printing apparatus according to claim 1, wherein the acquisition unit transmits, to the server, an acquisition request for the contractual information with an identification number of the printing apparatus.

8. A method for controlling a printing apparatus configured to be able to communicate with a server managing contractual information of a service of the printing apparatus, the method comprising:

acquiring the contractual information from the server; and causing the acquiring to reacquire the contractual information in response to an operation by a user selecting a predetermined button configured to display content related to the contractual information on a display device, in a case where the acquiring has failed to acquire the contractual information, wherein a function that displays the content related to the contractual information on the display device is restricted to be used because of failure in acquiring the contractual information.

9. A non-transitory computer-readable storage medium storing a program for causing a computer to execute each step of a controlling method of a printing apparatus configured to be able to communicate with a server managing contractual information of a service of the printing apparatus, the method comprising:

acquiring the contractual information from the server; and causing the acquiring to reacquire the contractual information in response to an operation by a user selecting a predetermined button configured to display content related to the contractual information on a display device, in a case where the acquiring has failed to acquire the contractual information, wherein a function that displays the content related to the contractual information on the display device is restricted to be used because of failure in acquiring the contractual information.

* * * * *